United States Patent [19]
Noda

[11] Patent Number: 5,742,268
[45] Date of Patent: Apr. 21, 1998

[54] OPTICAL MODULATION DEVICE HAVING BIAS RESET MEANS

[75] Inventor: Arihide Noda, Tokyo, Japan

[73] Assignee: NEC Corporation, Tokyo, Japan

[21] Appl. No.: 554,356

[22] Filed: Nov. 6, 1995

[30] Foreign Application Priority Data

Nov. 4, 1994 [JP] Japan ................... 6-270986

[51] Int. Cl.$^6$ .............................. G02F 1/03; G02F 1/295
[52] U.S. Cl. ................... 345/84; 359/249; 385/5
[58] Field of Search ................... 359/180–187, 359/323, 194, 188, 152, 153, 161, 245–247, 249; 250/205; 345/84, 89, 98, 99, 100; 385/2, 3, 4, 5; 372/38

[56] References Cited

U.S. PATENT DOCUMENTS

| | | | |
|---|---|---|---|
| 3,714,438 | 1/1973 | Hahn et al. | 359/181 |
| 4,369,525 | 1/1983 | Breton et al. | 359/187 |
| 4,864,649 | 9/1989 | Tajima | 359/181 |
| 4,903,273 | 2/1990 | Bathe | 372/38 |
| 5,003,624 | 3/1991 | Terbrack et al. | 455/618 |
| 5,060,310 | 10/1991 | Frisch et al. | 359/188 |
| 5,065,456 | 11/1991 | Nakayama | 359/187 |
| 5,149,953 | 9/1992 | Erwin | 359/323 |
| 5,170,274 | 12/1992 | Kuwata et al. | 359/183 |
| 5,210,633 | 5/1993 | Trisno | 359/194 |
| 5,321,543 | 6/1994 | Huber | 359/187 |
| 5,343,324 | 8/1994 | Le et al. | 359/181 |
| 5,440,113 | 8/1995 | Morin et al. | 359/187 |
| 5,488,503 | 1/1996 | Schaffner et al. | 359/245 |

FOREIGN PATENT DOCUMENTS

| | | |
|---|---|---|
| 0444688 | 9/1991 | European Pat. Off. . |
| 55-133017 | 10/1980 | Japan . |
| 4-294318 | 10/1992 | Japan . |

OTHER PUBLICATIONS

Kao et al., "2·5 Gbit/s Ti: LiNbO$_3$ External Modulator Transmitter and Its Long Distance Transmission Performance in the Field", *Electronics Letters*, vol. 28, No. 7, Mar. 26, 1992, pp. 687–689.

*Primary Examiner*—Steven Saras
*Attorney, Agent, or Firm*—Sughrue, Mion, Zinn, Macpeak & Seas, PLLC

[57] ABSTRACT

An optical modulation device comprises an optical modulator in which the operating point is varied according to a bias voltage. A phase deviation of an operating point from a selected optimal operating point is detected by a phase comparator based on an output light of the optical modulator. The bias voltage is generated within a predetermined voltage range by a DC amplifier so as to reduce the phase deviation. A reset circuit resets the bias voltage at the ground voltage associated with the selected optimal operating point when the optical modulator is powered up and passes the bias voltage to the optical modulator at all other times.

23 Claims, 5 Drawing Sheets

AVAILABLE RANGE OF BIAS VOLTAGE 409

5,742,268

OPTICAL MODULATION DEVICE HAVING BIAS RESET MEANS

BACKGROUND OF THE INVENTION

1. Field of the Invention

The present invention relates to optical modulation devices, and in particular to an optical modulation device comprising an optical modulator in which a bias voltage causes modulation characteristics to be changed.

2. Description of the Related Art

Some optical modulators use the electro-optic or magneto-optic effect to modulate an input light wave in amplitude according to an input signal. These optical modulators are designed to set an operating point at one of optimal operating points according to a predetermined bias voltage applied thereto. However, since the modulation characteristics is changed due to variations of temperature and deterioration over time, a current operating point frequently varies. In order to avoid such a variation, a feedback control circuit is generally provided with the optical modulator. More specifically, the feedback control circuit monitors a deviation of a current operating point from the optimal operating point by using the output light of the optical modulator and controls the bias voltage so as to operate the optical modulator at the optimal operating point.

As an example of the feedback control circuit described above, an automatic control circuit of a bias voltage applied to a Mach-Zehnder optical modulator is disclosed in Japanese Patent Unexamined Publication No. 4-294318. This feedback control circuit monitors the respective power averages of two complementary outputs having phases opposite to each other and generates a monitoring voltage corresponding to the difference between the two power averages. The bias voltage of the Mach-Zehnder optical modulator is adjusted based on the monitoring voltage which is generated at the time when the current operating point is optimal. Since the monitoring voltage is generated by calculating the difference between the respective power averages of the complementary outputs, the power difference for use in control is doubled in comparison to a feedback control based on a power average of one output, resulting in more reliable control of the bias voltage applied to the optical modulator.

However, since it is not initially determined which operating point is selected from the optimal operating points, the following problem arises in the conventional control circuit. Generally, the available range of the bias voltage is restricted within the power supply voltage supplied to a DC amplifier (or a bias voltage generating circuit). Therefore, the bias control needs to be performed within the available output voltage range of the DC amplifier. In other words, in cases where the optical modulator is initially set at an optimal operating point corresponding to a position close to the upper or lower limit of the available output voltage range of the DC amplifier, there is a possibility that a bias voltage to be applied to the optical modulator is above the upper limit or below the lower limit of the DC amplifier when a drift of the modulation characteristics occurs as mentioned above. As a result, the bias voltage generated by the DC amplifier becomes fixed at the upper or lower limit, which causes the modulated light output from the optical modulator to be distorted.

SUMMARY OF THE INVENTION

An object of the present invention is to provide an optical modulation device which performs optical modulation without distorting the modulated light signal even when a drift of the modulation characteristics occurs due to temperature variations and deterioration over time.

Another object of the present invention is to provide a bias control circuit and method for setting a bias voltage for use in feedback control at an optimal operating point associated with the center of the available voltage range of a bias voltage supplying circuit.

In accordance with an aspect of the present invention, an optical modulator is reset at an initial optimal operating point by a predetermined bias voltage when initialized and is controlled according to a bias voltage obtained based on an output light of the optical modulator at all other times. More specifically, the optical modulation device is comprised of an optical modulator which modulates an input light wave according to a modulating signal at an operating point which is determined by a bias voltage. The optical modulator exhibits a predetermined modulation characteristic having a plurality of optimal operating points. The optical modulation device is further comprised of a deviation detector for detecting a deviation of the operating point from a selected optimal operating point based on an output light of the optical modulator, a bias voltage generator for generating the bias voltage within a predetermined voltage range so as to reduce the deviation, and a reset circuit for resetting the bias voltage at a predetermined voltage associated with the selected optimal operating point when the optical modulator is initialized.

Preferably, the reset circuit is comprised of a timer for timing a predetermined time period starting from power-up, and a switch for switching the bias voltage to the predetermined voltage during the predetermined time period starting from power-up.

The predetermined voltage is preferably positioned at the center of the predetermined voltage range of the bias voltage. More specifically, the center voltage of the predetermined voltage range is preset at the ground voltage.

The optical modulator necessitates a bias-controlled modulation characteristic such that an operating point is changed by a bias voltage. Preferably, a Lithium Niobate material is used in the optical modulator.

DETAILED DESCRIPTION OF THE PREFERRED EMBODIMENTS

Figure 1:
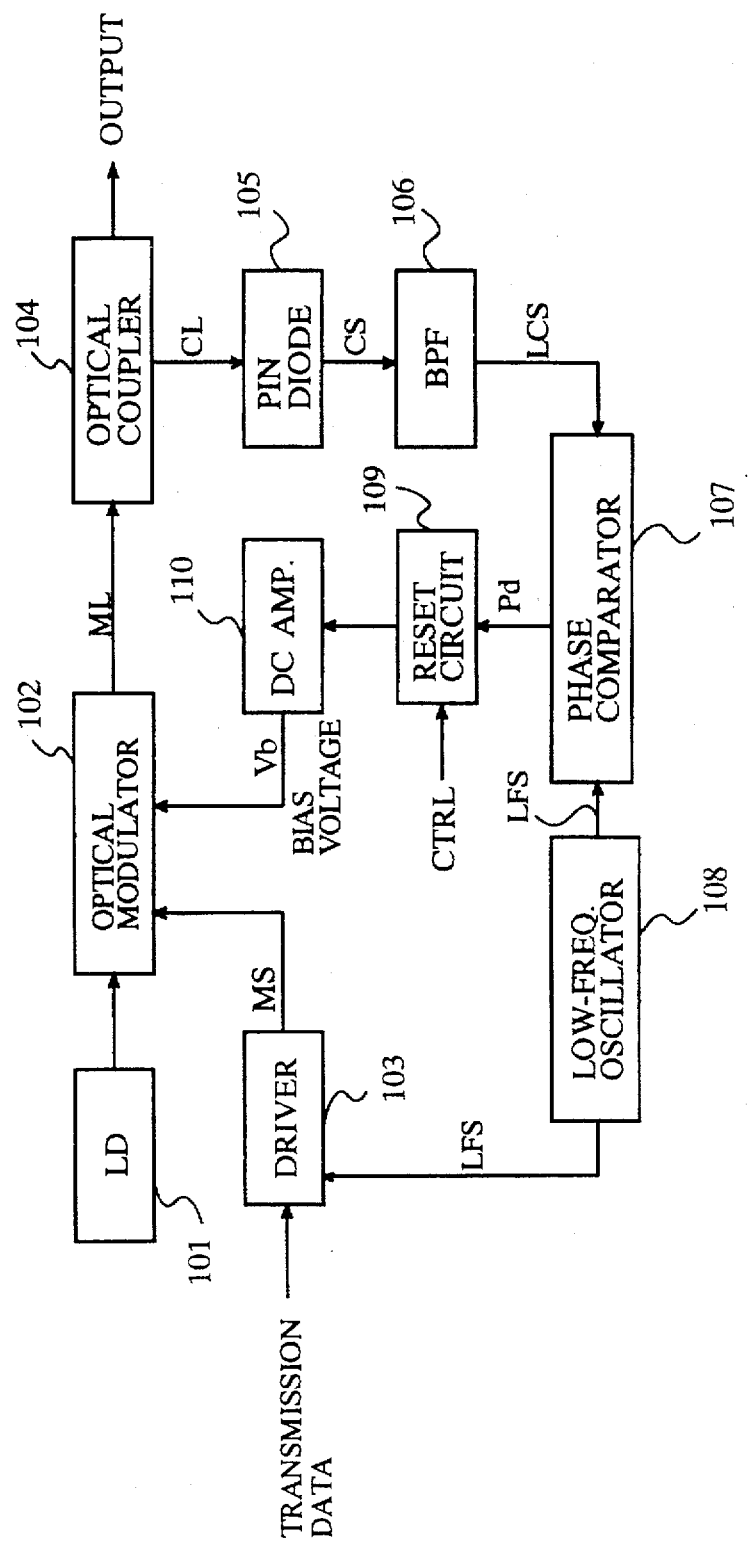
FIG. 1 is a block diagram illustrating a circuit of an optical modulation device according to an embodiment of the present invention.

Referring to FIG. 1, an optical modulation device is comprised of an optical modulation section and a bias control section. The optical modulation section includes a laser diode 101, an optical modulator 102, a drive amplifier 103 and an optical coupler 104. The bias control section is comprised of a photodetector 105, a band-pass filter 106, a phase comparator 107, a low-frequency oscillator 108, a reset circuit 109 and a DC amplifier 110.

Figure 4:
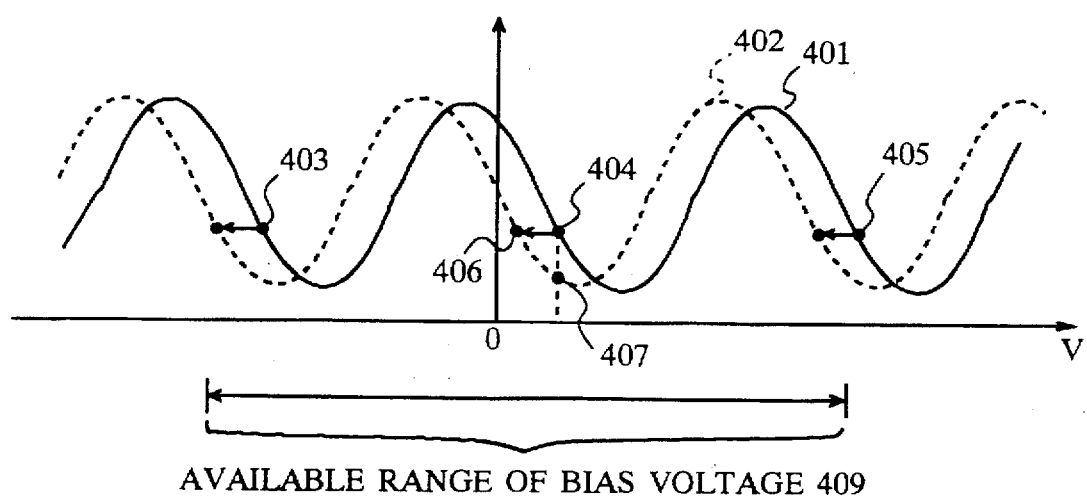
FIG. 4 is a waveform chart illustrating the modulation characteristics of the optical modulator in the embodiment.

The laser diode 101 outputs a light wave of a predetermined wavelength to the optical modulator 102. Receiving the light wave from the laser diode 101, the optical modulator 102 modulates the light wave in amplitude according to a modulating signal MS received from the drive amplifier 103. The optical modulator 102 uses the electro-optic effect of Lithium Niobate ($LiNbO_3$) to perform the optical modulation. As another electro-optic material, Lithium Tatalate ($LiTaO_3$) may be used. The optical modulator 102 exhibits the modulation characteristics as shown in FIG. 4 where a plurality of optimal operating points appear repeatedly at predetermined intervals. An optimal operating point is initially selected and is thereafter adjusted according to a bias voltage Vb received from the DC amplifier 110.

The drive amplifier 103 receives transmission data from an external source as well as a low-frequency signal LFS of a sine wave from the low-frequency oscillator 108. The low-frequency signal LFS has a frequency sufficiently lower than that of the transmission data. Superposing the low-frequency signal LFS on the transmission data, the drive amplifier 103 outputs the modulating signal MS to the optical modulator 102.

The modulated light wave ML is output from the optical modulator 102 to the optical coupler 104 through which the modulated light wave ML is output to an external device and to the photodetector 105 as a light wave CL for use in the bias control. The light wave CL is received by the photodetector 105 such as a PIN photodiode which converts the light wave CL into an electrical signal CS and outputs it to the band-pass filter 106. The band-pass filter 106 allows a low-frequency component LCS to pass while stopping others. The low-frequency component LCS has the same frequency as the low-frequency signal LFS and is output to the phase comparator 107.

The phase comparator 107 receives the low-frequency signal LFS from the low-frequency oscillator 108 and the low-frequency component LCS from the band-pass filter 106. Comparing the low-frequency signal LFS with the low-frequency component LCS, the phase comparator 107 outputs a phase difference signal Pd to the reset circuit 109.

The reset circuit 109 selects one of the phase difference signal Pd and the ground voltage according to a timer incorporated therein or a control signal CTRL. The signal selected by the reset circuit 109 is output to the DC amplifier 110. More specifically, the reset circuit 109 outputs the ground voltage to the DC amplifier 110 during a preset time period starting from power-on. The timer is reset for the time period ranging from several hundred milliseconds to 1 second as described later.

The DC amplifier 110 is designed to generate the bias voltage Vb ranging from the negative power supply voltage to the positive according to the signal selected by the reset circuit 109. More specifically, when receiving the ground voltage from the reset circuit 109, the DC amplifier 110 fixes the bias voltage Vb at the ground voltage, and when receiving the phase difference signal Pd, the DC amplifier 110 adjusts the bias voltage Vb according to the phase difference signal Pd. Since the reset circuit 109 outputs the ground voltage to the DC amplifier 110 during the preset time interval starting from power-on, the ground voltage is output as the bias voltage Vb to the optical modulator 102 during that interval. In addition, the central voltage of the bias voltage range available in the ground voltage is preset at the ground voltage. Receiving the bias voltage Vb from the DC amplifier, the operating point of the optical modulator 102 is set at a phase position of the modulation characteristics corresponding to the bias voltage Vb, as shown in FIG. 4.

Figure 2:
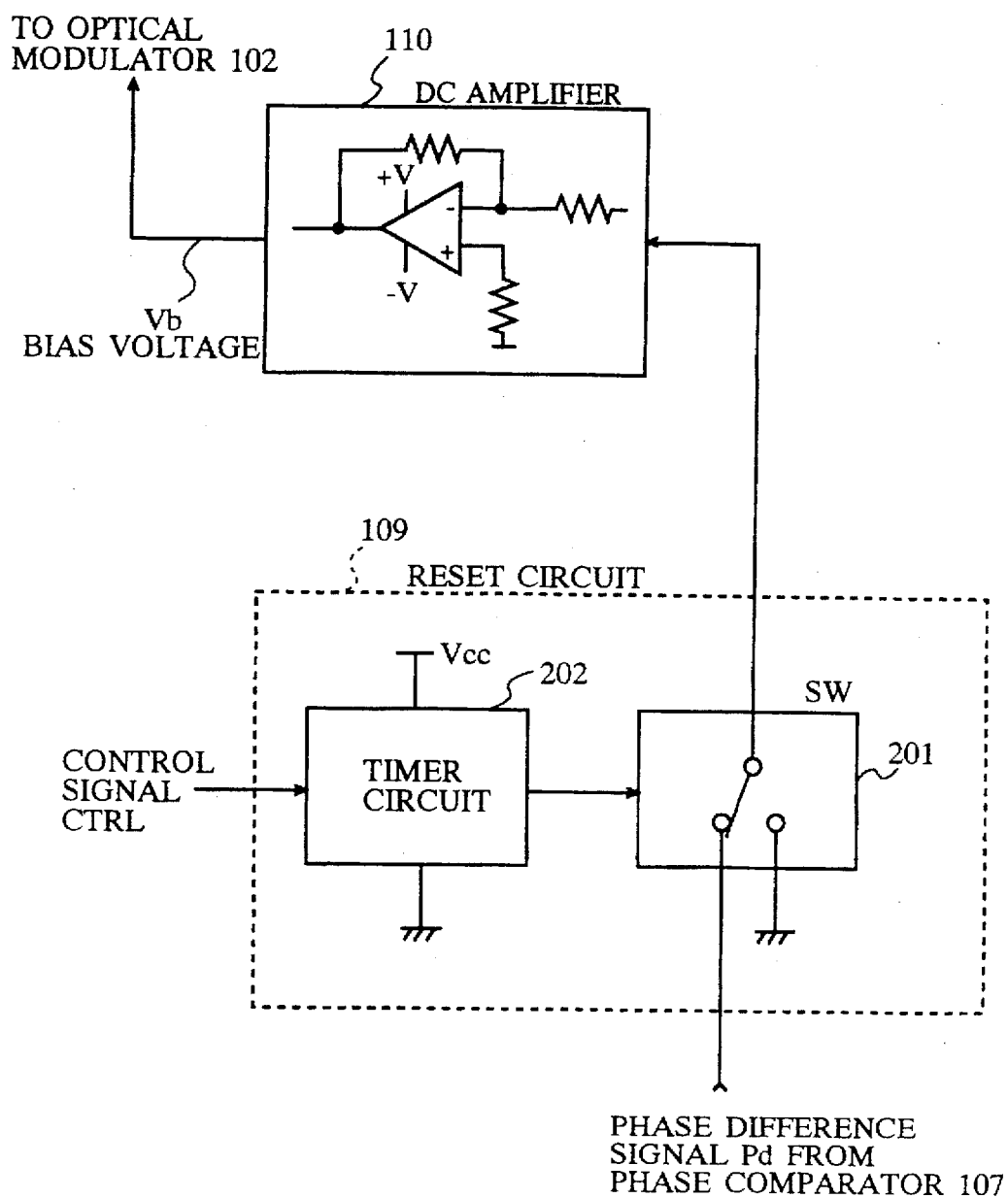
FIG. 2 is a circuit diagram illustrating a reset circuit and a DC amplifier in the embodiment.

As illustrated in FIG. 2, the reset circuit 109 is comprised of an analog switch 201 and a timer circuit 202. The analog switch 201 selects one of the phase difference signal Pd and the ground voltage according to the reset control signal RCS received from the timer circuit 202. More specifically, when receiving a reset signal, e.g. the value 1 of the reset control signal RCS, from the timer circuit 202, the analog switch 201 selects the ground voltage, and when a set signal, e.g. the value 0 of the reset control signal RCS, the analog switch 201 selects the phase difference signal Pd. The selected one is output to the DC amplifier 110.

The timer circuit 202 outputs the reset signal to the analog switch 201 during the preset time period starting when powered up and outputs the set signal at all other times. Power-up may be detected by the timer circuit 202 itself as described later. Alternatively, the timer circuit 202 may detect the power-up by receiving a control signal CTRL from a main controller (not shown).

The DC amplifier 110 is typically comprised of one or more operational amplifiers driven by two power supply voltages +V and −V, and is designed to have a dynamic range between +V and −V. In other words, the output voltage, that is, the bias voltage Vb of the DC amplifier 110 is available within the range between +V and −V. Furthermore, the DC amplifier 110 is designed such that the ground voltage is output when the ground voltage is input and the ground voltage is at the center of the dynamic range between +V and −V.

Figure 3:
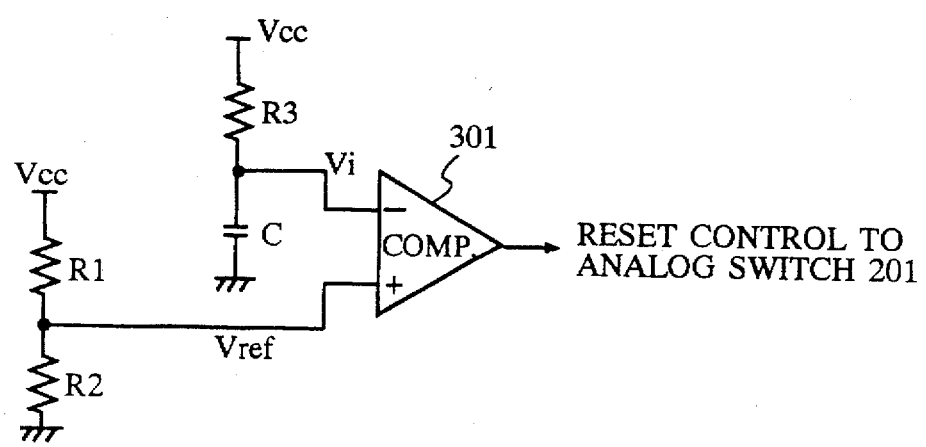
FIG. 3 is a circuit diagram illustrating a timer circuit of the reset circuit in the embodiment.

FIG. 3 shows an example of the timer circuit 202. In this example, a comparator 301 is employed to output the reset control signal RCS to the analog switch 201. A reference voltage Vref, or a threshold level, supplied to the non-inverting input of the comparator 301 is generated by a voltage divider comprising two resistors R1 and R2 connected in series. The comparison voltage Vi supplied to the inverting input of the comparator 301 is generated by an integrator circuit comprising a resistor R3 and a capacitor C connected in series. Since the comparison voltage Vi is a voltage across the capacitor C, when powered on, the comparison voltage Vi rises toward the power supply voltage Vcc with the time constant determined by the resistor R3 and the capacitor C. Therefore, the reset signal of the value 1 is output from the comparator 301 to the analog switch 201 until the comparison voltage Vi reaches the reference voltage Vref. When the comparison voltage Vi is greater than the reference voltage Vref, the set signal of the value 0 is output to the analog switch 201.

OPERATION

FIG. 4 shows modulation characteristics of the optical modulator 102, where the horizontal axis indicates input signal voltages and the vertical axis indicates output light intensities. As indicated by a solid line 401, the optical modulator 102 exhibits a modulation characteristic similar to a sine wave. In such a modulation characteristic, an optimal operating point of the optical modulator 102 should be selected so as to achieve the broadest dynamic range with respect to the input signal MS. Since the modulation characteristic is similar to a sine wave, the optical modulator 102 has a plurality of optimal operating points as indicated by reference numerals 403, 404 and 405.

However, as mentioned above, the modulation characteristic is frequently changed due to temperature variations and deterioration over time of the electro-optic material. Such a drift of the modulation characteristic is shown by a broken line 402, where the respective optimal operating points 403–405 are shifted as shown by the arrows, for example, the point 404 of the solid line 401 is shifted to the point 406 of the broken line 402. In cases where such a drift of the modulation characteristic occurs, the bias control is performed as follows.

As mentioned above, the driver amplifier 103 outputs the modulating signal MS to the optical modulator 102 with superposing the low-frequency signal LFS of a sine wave on the transmission data. If the optical modulator 102 has no change in modulation characteristic, the band-pass filter 106 should output the same sine wave signal LCS as the low-frequency signal LFS. Since the phase of the sine wave signal LCS is identical to that of the low-frequency signal LFS, the phase comparator 107 outputs the phase difference signal Pd of the ground voltage to the DC amplifier 110 through the reset circuit 109 which is in the set state. Therefore, the optical modulator 102 holds its initial optimal operating point (404) which has been set by the reset circuit 109 on power-up.

If the optical modulator 102 changes in modulation characteristic as shown by the broken line 402 and the optimal operating point is shifted with respect to the input signal voltage, then a current operating point 407 is deviated from the shifted optimal operating point 406 as shown in FIG. 4. Therefore, the extracted signal LCS by the band-pass filter 106 is deviated in phase from the low-frequency signal LFS originally generated by the low-frequency oscillator 108. The phase difference signal Pd representing the phase deviation is output to the DC amplifier 110 through the reset circuit 109 which is in the set state, and thereby the bias voltage Vb applied to the optical modulator 102 is varied such that the optical modulator 102 follows the shift of the optimal operating point. In this manner, the optical modulator 102 keeps operating at the optimal operating point which is initially set by the reset circuit 109 regardless of any drift of the modulation characteristic.

The initial optimal operating point 404 is selected by the reset circuit 109 outputting the ground voltage to the DC amplifier 110 on power-up. More specifically, when powered up, the reset circuit 109 is turned to the reset state in which the ground voltage is output to the DC amplifier 110 for the preset time period after power-up. Therefore, the bias voltage Vb is fixed at the ground voltage (zero Volts) which is the center of the available voltage range as shown in FIG. 4.

After the preset time period has lapsed, the reset circuit 109 is turned to the set state in which the phase difference signal Pd is transferred to the DC amplifier 110 passing through the reset circuit 109. Therefore, the bias voltage Vb is varied according to the phase difference signal Pd, causing the operating point of the optical modulator 102 to be shifted to the nearest optimal operating point 404. In this manner, the search for the initial bias voltage corresponding to an optimal operating point is started from the ground voltage, that is, the center of the available range of bias voltage. Therefore, the optical modulator 102 is set at an optimal operating point closest to the ground voltage. If the initial bias voltage corresponding to the optimal operating point is known, the reset circuit 109 may output an initial voltage other than the ground voltage to the DC amplifier 110 such that the initial bias voltage Vb is output to the optical modulator 102.

Figure 5:
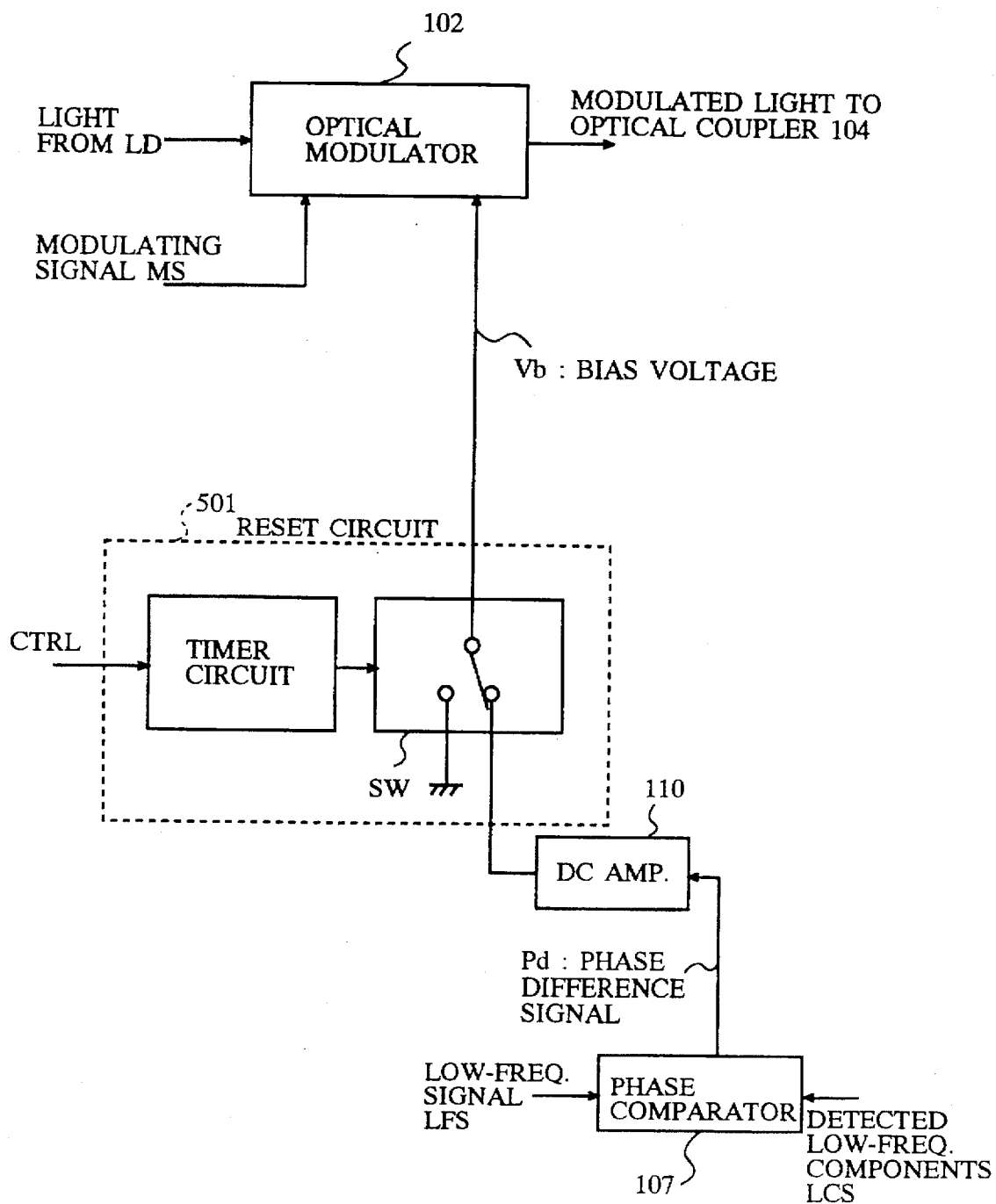
FIG. 5 is a block diagram partially illustrating a circuit of an optical modulation device according to another embodiment of the present invention.

FIG. 5 shows another embodiment of the present invention. In this embodiment, the DC amplifier 110 is connected to the optical modulator 102 through a reset circuit 501 which is the same circuit arrangement as the reset circuit 109 as shown in FIG. 2. The reset circuit 501 is comprised of an analog switch SW and a timer. The analog switch SW selects one of the bias voltage and the ground voltage according to the reset control signal received from the timer. More specifically, when receiving a reset signal from the timer, the analog switch SW selects the ground voltage, and when receiving a set signal, the analog switch SW selects the bias voltage received from the DC amplifier 110. The selected one is output as the bias voltage Vb to the optical modulator 102. It is apparent that this arrangement can also obtain the same advantages as the above-mentioned arrangement as shown in FIG. 2.

Although, in the above embodiments, the center of the available voltage range is set at the ground voltage, the center of the available voltage range may be set at 7.5 volts in cases where the available voltage range spans from 0 to 15 volts.

In addition, instead of the optical modulator using the electro-optic material such as $LiNbO_3$ and $LiTaO_3$, another type of optical modulator may be employed, for example, a waveguide-type optical modulator using the magneto-optic effect such as a Mach-Zehnder optical modulator. The important thing is that an optical modulator employed in the present invention is capable of changing in operating point according to a bias voltage.

Furthermore, the bias control section of the above modulation devices may employ another scheme such that the bias voltage is controlled based on the average power of the output light of the optical modulator.

What is claimed is:

1. An optical modulation device comprising:
   an optical modulator operable to modulate an input light wave according to an input signal at an operating point which is determined by a bias voltage;
   detecting means for detecting a deviation of said operating point from a selected optimal operating point based on an output of said optical modulator;
   bias generating means for generating said bias voltage within a predetermined voltage range of bias voltages so as to reduce said deviation; and
   reset means for setting said bias voltage at a predetermined voltage associated with said selected optimal operating point when said optical modulator is initialized, said optical modulator being operable to modulate the input light wave according to the input signal as said predetermined voltage is set as said bias voltage,
   wherein said predetermined voltage corresponds to a central voltage of said predetermined voltage range.

2. The optical modulation device according to claim 1, wherein said central voltage of said predetermined voltage range is preset at a ground voltage.

3. The optical modulation device according to claim 1, wherein said optical modulator comprises a Lithium Niobate ($LiNbO_3$) material for use in optical modulation.

4. The optical modulation device according to claim 1, wherein said optical modulator comprises a Lithium Tatalate ($LiTaO_3$) material for use in optical modulation.

5. An optical modulation device comprising:
   an optical modulator operable to modulate an input light wave according to an input signal at an operating point which is determined by a bias voltage;
   detecting means for detecting a deviation of said operating point from a selected optimal operating point based on an output of said optical modulator;

bias generating means for generating said bias voltage within a predetermined voltage range of bias voltages so as to reduce said deviation; and reset means for setting said bias voltage at a predetermined voltage associated with said selected optimal operating point when said optical modulator is initialized, said optical modulator being operable to modulate the input light wave according to the input signal as said predetermined voltage is set as said bias voltage, wherein said reset means comprises:

a timer for timing a predetermined time period starting from power-up of said optical modulation device; and a switch, responsive to said timer, for switching said bias voltage to said predetermined voltage during said predetermined time period starting from power up.

6. The optical modulation device according to claim 5, wherein said timer comprises:

a comparator;

a voltage divider; and an integrator including a resistor and capacitor, wherein an output of said voltage divider is input to a non-inverting input of said comparator and an output of said integrator is input to an inverting input of said comparator, wherein the output of said integrator increases towards a supply voltage according to an RC time constant of said resistor and said capacitor, and wherein said predetermined time period lapses when said comparator determines that the output of said integrator exceeds the output of said voltage divider.

7. An optical modulation device comprising:

an optical modulator operable to modulate an input light wave according to an input signal at an operating point which is determined by a bias voltage;

detecting means for detecting a deviation of said operating point from a selected optimal operating point based on an output of said optical modulator to generate a deviation signal;

selecting means for selecting one of said deviation signal and a ground voltage as a bias setting signal;

selection control means for outputting a first selection signal to said selecting means during a predetermined time period after said optical modulator is initialized, said first selection signal causing said selecting means to select said ground voltage as said bias setting signal, and for outputting a second selection signal to said selecting means at other times, said second selection signal causing said selecting means to select said deviation signal as said bias setting signal; and bias generating means for generating said bias voltage within a predetermined voltage range based on said bias setting signal received from said selecting means such that said bias voltage varies according said deviation signal when said deviation signal is received as said bias setting signal and said bias voltage is fixed at said ground voltage when said ground voltage is received as said bias setting signal, said optical modulator being operable to modulate the input light wave according to the input signal as said ground voltage is generated as said bias voltage.

8. The optical modulation device according to claim 7, wherein said selection control means comprises a timer for timing said predetermined time period starting from a power-up of said optical modulation device, for outputting said first selection signal during said predetermined time period, and for outputting said second selection signal after said predetermined time period has lapsed.

9. The optical modulation device according to claim 8, wherein said timer comprises:

a comparator;

a voltage divider; and an integrator including a resistor and capacitor, wherein an output of said voltage divider is input to a non-inverting input of said comparator and an output of said integrator is input to an inverting input of said comparator, wherein the output of said integrator increases towards a supply voltage according to an RC time constant of said resistor and said capacitor, and wherein said comparator outputs said second selection signal when the output of said integrator exceeds the output of said voltage divider.

10. An optical modulation device comprising:

an optical modulator operable to modulate an input light wave according to an input signal at an operating point which is determined by a bias voltage;

detecting means for detecting a deviation of said operating point from a selected optimal operating point based on an output of said optical modulator to generate a deviation signal;

generating means for generating a DC voltage within a predetermined voltage range based on said deviation signal received from said detecting means;

selecting means for selecting said bias voltage from one of said DC voltage and a ground voltage; and selection control means for outputting a first selection signal to said selecting means during a predetermined time period after said optical modulator is initialized, said first selection signal causing said selecting means to select said ground voltage as said bias voltage, said optical modulator being operable to modulate the input light wave according to the input signal as said ground voltage is selected as said bias voltage, and for outputting a second selection signal to said selecting means at other times, said second selection signal causing said selecting means to select said DC voltage as said bias voltage.

11. The optical modulation device according to claim 10, wherein said selection control means comprises a timer for timing said predetermined time period starting from a power-up of said optical modulation device, for outputting said first selection signal during said predetermined time period, and for outputting said second selection signal after said predetermined time period has lapsed.

12. The optical modulation device according to claim 11 wherein said timer comprises:

a comparator;

a voltage divider; and an integrator including a resistor and capacitor, wherein an output of said voltage divider is input to a non-inverting input of said comparator and an output of said integrator is input to an inverting input of said comparator, wherein the output of said integrator increases towards a supply voltage according to an RC time constant of said resistor and said capacitor, and wherein said comparator outputs said second selection signal when the output of said integrator exceeds the output of said voltage divider.

13. An optical modulation device comprising:
an optical modulator operable to modulate an input light wave according to a modulating signal at an operating point which is determined by a bias voltage;
generating means for generating a low-frequency signal having a predetermined frequency lower than an input signal;
superposing means for superposing said low-frequency signal on said input signal to output said modulating signal to said optical modulator;
detecting means for detecting a low-frequency component of said predetermined frequency from an output of said optical modulator;
phase comparing means for comparing said low-frequency signal to said low-frequency component in phase to generate a phase difference signal indicating a phase difference between said low-frequency signal and said low-frequency component;
bias generating means for generating said bias voltage within a predetermined voltage range so as to reduce said phase difference; and
reset means for setting said bias voltage at a predetermined voltage associated with said selected optimal operating point when said optical modulator is initialized.

14. The optical modulation device according to claim 13, wherein said reset means comprises:
a timer for timing a predetermined time period starting from a power-up of said optical modulating device; and
a switch, responsive to said timer, for switching said bias voltage to said predetermined voltage during said predetermined time period starting from power-up.

15. The optical modulation device according to claim 14, wherein said timer comprises:
a comparator;
a voltage divider; and
an integrator including a resistor and capacitor,
wherein an output of said voltage divider is input to a non-inverting input of said comparator and an output of said integrator is input to an inverting input of said comparator,
wherein the output of said integrator increases towards a supply voltage according to an RC time constant of said resistor and said capacitor, and wherein said predetermined time period lapses when said comparator determines that the output of said integrator exceeds the output of said voltage divider.

16. The optical modulation device according to claim 13, wherein said predetermined-voltage is a central voltage of said predetermined voltage range.

17. The optical modulation device according to claim 16, wherein said central voltage of said predetermined voltage range is preset at a ground voltage.

18. The optical modulation device according to claim 13, wherein said predetermined voltage is preset at a ground voltage.

19. The optical modulation device according to claim 13, wherein said optical modulator comprises a Lithium Niobate (LiNbO$_3$) material for use in optical modulation.

20. The optical modulation device according to claim 13, wherein said optical modulator comprises a Lithium Tatalate (LiTaO$_3$) material for use in optical modulation.

21. A bias control method for use in an optical modulation device comprising an optical modulator operable to modulate an input light wave according to an input signal at an operating point which is determined by a bias voltage said method comprising the steps of:
detecting a deviation of said operating point from a selected optimal operating point based on an output of said optical modulator;
generating said bias voltage within a predetermined voltage range so as to reduce said deviation; and
setting said bias voltage at a predetermined voltage associated with said selected optimal operating point when said optical modulator is initialized, said predetermined voltage corresponding to a central voltage of said predetermined range, said optical modulator being operable to modulate the input light wave according to the input signal during said setting step.

22. A bias control method for use in an optical modulation device comprising an optical modulator operable to modulate an input light wave according to a modulating signal at an operating point which is determined by a bias voltage said method comprising the steps of:
generating a low-frequency signal having a predetermined frequency lower than the input signal;
superposing said low-frequency signal on said input signal to output said modulating signal to said optical modulator;
detecting a low-frequency component of said predetermined frequency from an output of said optical modulator;
comparing said low-frequency signal to said low-frequency component in phase to generate a phase difference signal indicating a phase difference between said low-frequency signal and said low-frequency component;
generating said bias voltage within a predetermined voltage range to reduce said phase difference; and
setting said bias voltage at a predetermined voltage associated with said selected optimal operating point when said optical modulator is initialized, said predetermined voltage corresponding to a central voltage of said predetermined range, said optical modulator being operable to modulate the input light wave according to the input signal during said setting step.

23. An optical modulation device comprising:
an optical modulator operable to modulate an input light wave according to an input signal at an operating point which is determined by a bias voltage;
detecting means for detecting a deviation of said operating point from a selected optimal operating point based on an output of said optical modulator to generate a deviation signal;
selecting means for selecting one of said deviation signal and a central voltage of a bias voltage range as a bias setting signal;
selection control means for outputting a first selection signal to said selecting means during a predetermined time period after said optical modulator is initialized, said first selection signal causing said selecting means to select said central voltage as said bias setting signal, said optical modulator being operable to modulate the input light wave according to the input signal as said central voltage is selected as said bias setting signal, and for outputting a second selection signal to said selecting means at other times, said second selection signal causing said selecting means to select said deviation signal as said bias setting signal; and bias generating means for generating said bias voltage within the bias voltage range based on said bias setting signal received from said selecting means such that said bias voltage varies according said deviation signal when said deviation signal is received as said bias setting signal and said bias voltage is fixed at said central voltage when said central voltage is received as said bias setting signal.

* * * * *